(12) United States Patent
Sawai

(10) Patent No.: US 10,046,830 B2
(45) Date of Patent: Aug. 14, 2018

(54) STRADDLE-TYPE VEHICLE

(71) Applicant: YAMAHA HATSUDOKI KABUSHIKI KAISHA, Iwata-shi, Shizuoka (JP)

(72) Inventor: Seiji Sawai, Shizuoka (JP)

(73) Assignee: YAMAHA HATSUDOKI KABUSHIKI KAISHA, Shizuoka (JP)

( * ) Notice: Subject to any disclaimer, the term of this patent is extended or adjusted under 35 U.S.C. 154(b) by 0 days.

(21) Appl. No.: 14/946,943

(22) Filed: Nov. 20, 2015

(65) Prior Publication Data

US 2016/0075405 A1 Mar. 17, 2016

Related U.S. Application Data

(62) Division of application No. 14/215,096, filed on Mar. 17, 2014, now Pat. No. 9,688,353.

(60) Provisional application No. 61/873,440, filed on Sep. 4, 2013.

(51) Int. Cl.
*B62D 21/11* (2006.01)
*B62D 21/18* (2006.01)
*B62M 27/02* (2006.01)

(52) U.S. Cl.
CPC ............ *B62M 27/02* (2013.01); *B62D 21/11* (2013.01); *B62D 21/183* (2013.01); *B62M 2027/026* (2013.01); *B62M 2027/028* (2013.01)

(58) Field of Classification Search
CPC .............................. B60G 13/00; B60G 13/003; B60G 2206/605; B60G 2300/322; B60G 99/00; B60G 2204/128; B62M 27/00; B62M 27/02; B62M 2027/028; B62M 2027/026; B62D 27/04

USPC ........ 180/190, 182, 186, 908; 280/784, 108, 280/124.108, 788, 900; 296/203.1
See application file for complete search history.

(56) References Cited

U.S. PATENT DOCUMENTS 5,575,352 A * 11/1996 Suzuki ..................... B60G 3/20
                     180/309
6,206,460 B1 * 3/2001 Seeliger ................. B62D 21/00
                     188/267
6,446,744 B2 * 9/2002 Wubbolts ................ B62J 35/00
                     180/190

(Continued)

OTHER PUBLICATIONS

Sawai, "Straddle-Type Vehicle", U.S. Appl. No. 14/215,096, filed Mar. 17, 2014.

(Continued)

*Primary Examiner* — Anne Marie M Boehler
(74) *Attorney, Agent, or Firm* — Keating and Bennett, LLP

(57) ABSTRACT

A snowmobile includes a transmission unit that transmits a driving force generated by an engine to the ground surface, in which ground touching portions of the transmission unit that are spaced apart from each other in the vehicle width direction receive reaction forces mutually different in magnitude from the ground surface; a suspension that supports the transmission unit so as to swing in the up-down direction; and a vehicle body vibration control damper extending between a first portion and a second portion that are spaced apart from each other of the vehicle body frame and a member fixed to the vehicle body frame, the vehicle body vibration control damper generating a damping force against variations that change the distance between the first portion and the second portion.

9 Claims, 10 Drawing Sheets

(56) References Cited

U.S. PATENT DOCUMENTS

| | | | | |
|---|---|---|---|---|
| 6,702,058 B2* | 3/2004 | Ishii | ................... | B62K 5/01 |
| | | | | 180/311 |
| 7,735,909 B2* | 6/2010 | Satou | ................... | B62D 25/20 |
| | | | | 280/781 |
| 7,798,564 B2* | 9/2010 | Doi | ................... | B62D 25/20 |
| | | | | 280/782 |
| 8,047,587 B2* | 11/2011 | Sawai | ................... | B60R 19/26 |
| | | | | 293/117 |
| 8,162,334 B2* | 4/2012 | Kondou | ................ | B62D 21/15 |
| | | | | 280/124.108 |
| 9,248,877 B1* | 2/2016 | Sawai | ................... | B62D 7/22 |
| 2004/0124604 A1* | 7/2004 | Takano | ................ | B62K 25/286 |
| | | | | 280/283 |
| 2008/0023989 A1* | 1/2008 | Hlopick | ............... | B62J 15/00 |
| | | | | 296/198 |
| 2009/0079232 A1* | 3/2009 | Harada | ................. | F16F 9/54 |
| | | | | 296/203.01 |
| 2015/0060159 A1* | 3/2015 | Sawai | ................... | F16F 15/023 |
| | | | | 180/9.42 |

OTHER PUBLICATIONS

Takata et al., "Straddle-Type Vehicle", U.S. Appl. No. 15/670,076, filed Aug. 7, 2017.

* cited by examiner

STRADDLE-TYPE VEHICLE

BACKGROUND OF THE INVENTION

1. Field of the Invention

The present invention relates to a straddle-type vehicle.

2. Description of the Related Art

Japanese Patent No. 4627389 discloses a technique for mounting a vehicle body vibration control damper so as to extend between predetermined positions on a vehicle body frame of a four-wheeled vehicle employing an independent suspension. When the wheels receive a reaction force from the ground surface while the vehicle is running, each wheel independently transmits a reaction force subjected to damping by a suspension device for the wheel to the vehicle body frame.

In a snowmobile, a track belt that transmits a driving force to the ground surface has a predetermined dimension in the vehicle width direction. A suspension that suspends this track belt uses a plurality of links provided between a vehicle body frame and the track belt. Suspension by the plurality of links allows the track belt to swing up and down around a virtual axis extending in the vehicle width direction relative to the vehicle body frame as a center (the position of the virtual axis always varies, rather than staying at one position).

Meanwhile, in an ATV (All-Terrain Vehicle), a pair of drive wheels that transmit a driving force to the ground surface are spaced apart from each other in the vehicle width direction. A suspension that suspends the drive wheels includes a rear arm in which one end is supported by the vehicle body frame via an axle provided on the vehicle body frame and extending in the vehicle width direction, and the other end of which rotatably supports a pair of drive wheels. The rear arm is arranged to swing up and down around the axle extending in the vehicle width direction relative to the vehicle body frame as a center.

There may be a case, when a vehicle runs, in which ground touching portions spaced apart from each other in the vehicle width direction may respectively receive reaction forces from the ground surface that are mutually different in the magnitude. In such a case, in a straddle-type vehicle, such as a snowmobile, an ATV, or the like, a moment that pushes up one side of the axle extending in the vehicle width direction may be transmitted to the vehicle body frame due to the arrangement of the suspension described above, wherein this moment is not caused in a conventional four-wheeled vehicle. This may cause unique vibrations to be generated in the vehicle body frame.

SUMMARY OF THE INVENTION

Preferred embodiments of the present invention have been conceived in view of the above, and include a straddle-type vehicle that damps vibrations of the vehicle body frame that result from the ground touching portions, spaced apart from each other in the vehicle width direction, receiving mutually different reaction forces in magnitude from the ground surface.

A straddle-type vehicle according to a preferred embodiment of the present invention includes a vehicle body frame; a power unit supported by the vehicle body frame; a steering system supported by the vehicle body frame; a transmission unit that transmits a driving force generated by the power unit to a ground surface, in which ground touching portions, spaced apart from each other in a vehicle width direction, receive reaction forces from the ground surface that are mutually different in magnitude; a suspension that suspends the transmission unit so as to swing in an up-down direction around an axle extending in the vehicle width direction relative to the vehicle body frame as a center; and a vehicle body vibration control damper extending between a first portion and a second portion that are spaced apart from each other of the vehicle body frame and a member fixed to the vehicle body frame, the vehicle body vibration control damper generating a damping force against variations that change a distance between the first portion and the second portion.

According to preferred embodiments of the present invention, the vehicle body vibration control damper damps vibrations in the vehicle body frame that result from the ground touching portions, spaced apart from each other in the vehicle width direction, receiving mutually different reaction forces in magnitude from the ground surface.

The above and other elements, features, steps, characteristics and advantages of the present invention will become more apparent from the following detailed description of the preferred embodiments with reference to the attached drawings.

DETAILED DESCRIPTION OF THE PREFERRED EMBODIMENTS

Preferred embodiments of the present invention will be described with reference to the drawings.

Figure 1:
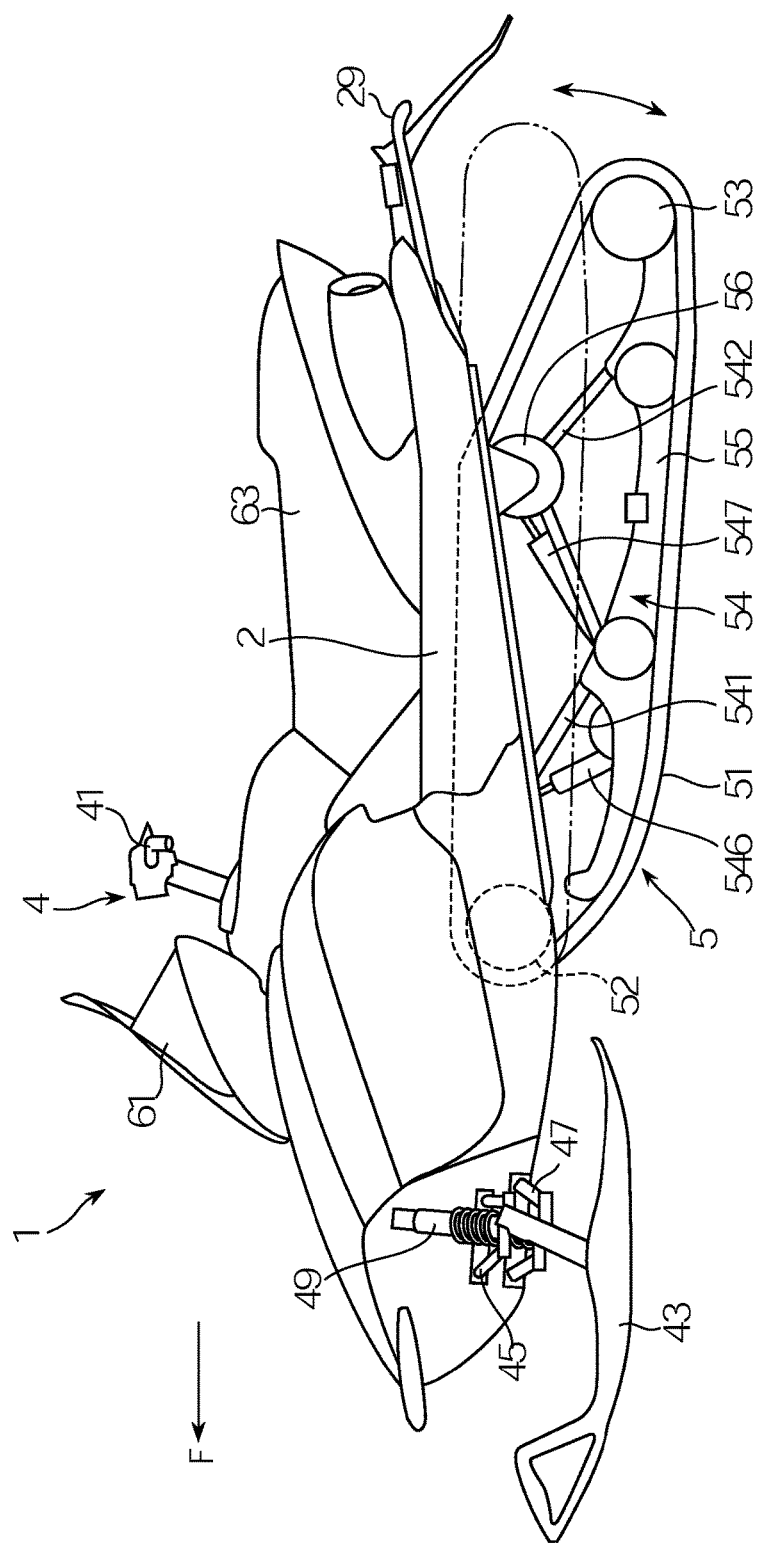
FIG. 1 is a side view of a snowmobile as an example of a straddle-type vehicle according to a preferred embodiment of the present invention.
Figure 2:
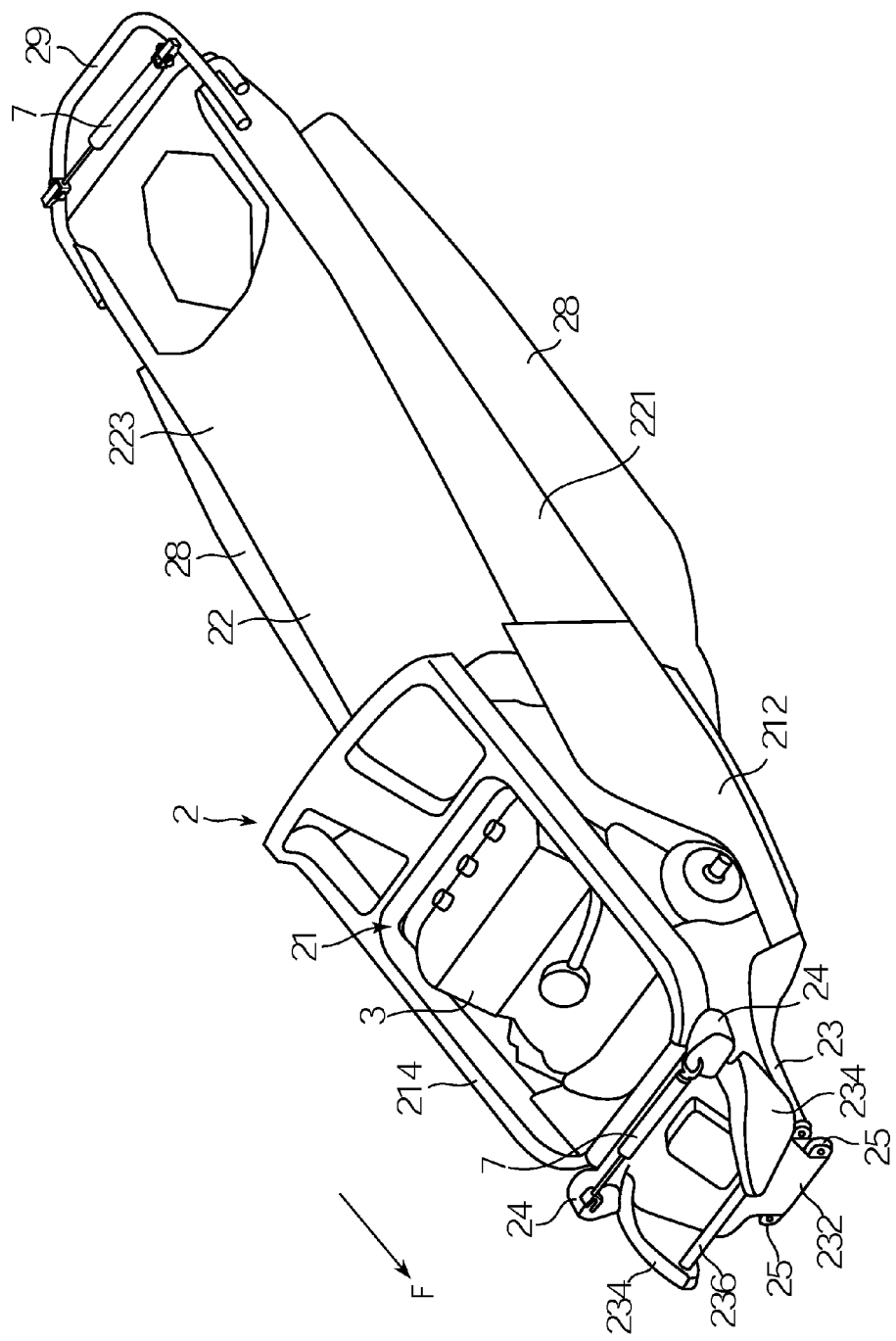
FIG. 2 is a perspective view of a vehicle body frame of the snowmobile.

Below, a snowmobile as an example of a straddle-type vehicle according to a preferred embodiment of the present invention will be described. FIG. 1 is a side view of a snowmobile 1. FIG. 2 is a perspective view of a vehicle body frame 2 of the snowmobile 1. The arrow F in FIGS. 1 and 2 indicate the vehicle forward direction.

The snowmobile 1 includes a vehicle body frame 2 made of metal. An engine storage 21 is provided in the front portion of the vehicle body frame 2, where an engine 3, that is one example of a power unit, is stored (see FIG. 2). The engine 3 preferably is, for example, a water cooled four cycle parallel three cylinder engine.

A steering system 4 is supported in the front half portion of the vehicle body frame 2. The steering system 4 includes a handle bar 41 for operation by a driver and a pair of left and right skis 43 of which the direction is changed in connection with rotation of the handle bar 41. The skis 43 are supported so as to move up and down by upper arms 45, lower arms 47, and shock absorbers 49. That is, so-called double wishbone suspensions are provided for the skis 43. A windshield 61 is mounted ahead of the handle bar 41, and a seat 15 for a driver to straddle is mounted behind the handle bar 41.

In the rear half portion of the vehicle body frame 2, a transmission unit 5 that transmits a driving force generated by the engine 3 to the ground surface is supported. The transmission unit 5 includes a track belt 51 that is rotated by a driving force from the engine 3. Specifically, inside the track belt 51, a drive wheel 52, a following wheel 53, a slider rail 55, and a following wheel 56 are mounted at the front end portion, at the rear end portion, between the drive wheel 52 and the following wheel 53, and above the slider rail 55, respectively. Of these, the drive wheel 52 and the following wheel 56 are supported by the vehicle body frame 2, while the following wheel 53 is supported by the rear end portion of the slider rail 55.

Between the vehicle body frame 2 and the slider rail 55, a plurality of torque arms 541, 542 and a plurality of shock absorbers 546, 547 are mounted, thus constituting a suspension 54 that supports the transmission unit 5 so as to swing in the up-down direction. In the suspension 54, a four-node link is implemented having nodes defined by respective upper and lower end portions of the torque arms 541, 542. That is, the torque arms 541, 542 are a part of the links included in the four-node link.

As shown in FIG. 2, the vehicle body frame 2 includes the engine storage 21, a belt storage 22 positioned behind the engine storage 21, and a ski support portion 23 positioned ahead of the engine storage 21. The engine storage 21 includes a pair of left and right lateral panel portions 212 and a top frame portion 214.

The belt storage 22 includes a pair of left and right lateral panel portions 221 and a top panel portion 223, and a configuration defined by a succession of concave cross sections extending in the front-back direction that open downward. A portion of the transmission unit 5 is provided in a space to the left and below the belt storage 22. The drive wheel 52 and the following wheel 56 of the transmission unit 5 are rotatably supported between the pair of left and right lateral panel portions 221. Foot rest portions 28 are integrally mounted at the lower end portion of the belt storage 22 so as to extend outward in the vehicle width direction. Further, a U-shaped grip bar 29 is fixed to the rear end portion of the belt storage 22. The grip bar 29 may be fixed to the rear end portion of the belt storage 22 by welding or by a fastener, such as a bolt or the like.

The ski support portion 23 includes a plurality of attachment portions 24, 25 where the upper arms 45, the lower arms 47, and the shock absorbers 49 shown in FIG. 1 are attached. Of these, the pair of left and right attachment portions 24 provided at the upper end portion of the ski support portion 23 project outward in the vehicle width direction, and the upper end portion of the shock absorbers 49 are attached to these attachment portions 24. Further, the ski support portion 23 is directed upward and forward, and includes a front wall portion 232, a pair of left and right projecting portions 234 projecting forward from the respective left and right sides of the front wall portion 232, and a bridge portion 236 extending between the pair of left and right projecting portions 234.

Figure 3:
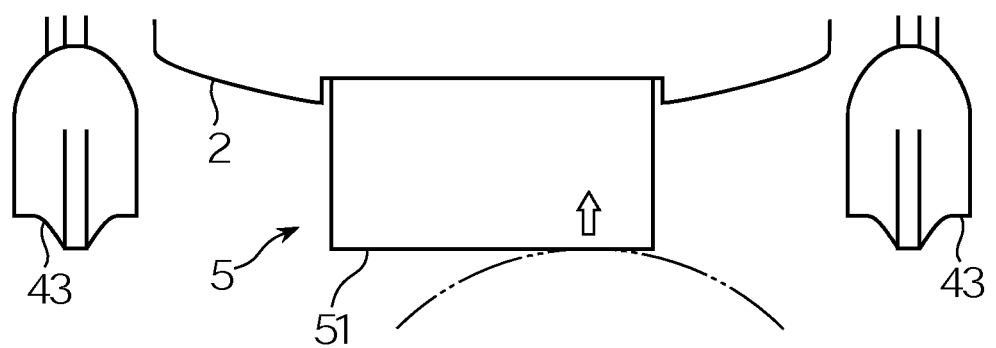
FIG. 3 is a front view showing an enlarged ground touching portion of the snowmobile.

As shown in FIG. 3, in the snowmobile 1 in the present preferred embodiment, when the track belt 51 of the transmission unit 5 has a predetermined dimension in the vehicle width direction, ground touching portions of the track belt 51 which are spaced apart from each other in the vehicle width direction receive reaction forces from the ground surface that are mutually different in magnitude. When the track belt 51 receives such reaction forces, a moment that pushes up one side of an axle extending in the vehicle width direction is transmitted from the transmission unit 5 to the vehicle body frame 2, which causes unique vibrations in the vehicle body frame 2.

In view of the above, in order to damp the unique vibrations in the vehicle body frame 2, the snowmobile 1 of the present preferred embodiment includes a plurality of vehicle body vibration control dampers 7. Each of the vehicle body vibration control dampers 7 is mounted to extend between first and second portions that are spaced apart from each other of the vehicle body frame and a member fixed to the vehicle body frame 2, and to generate a damping force against vibrations that change the distance between the first portion and the second portion.

Figure 4:
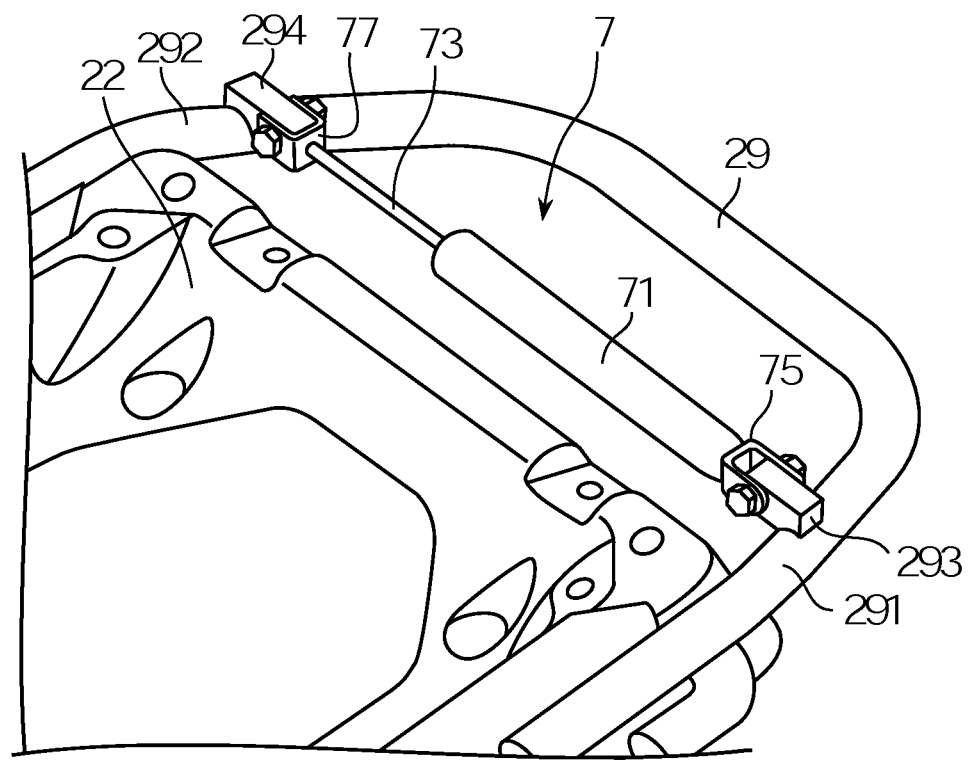
FIG. 4 shows enlarged major elements shown in FIG. 2.
Figure 5:
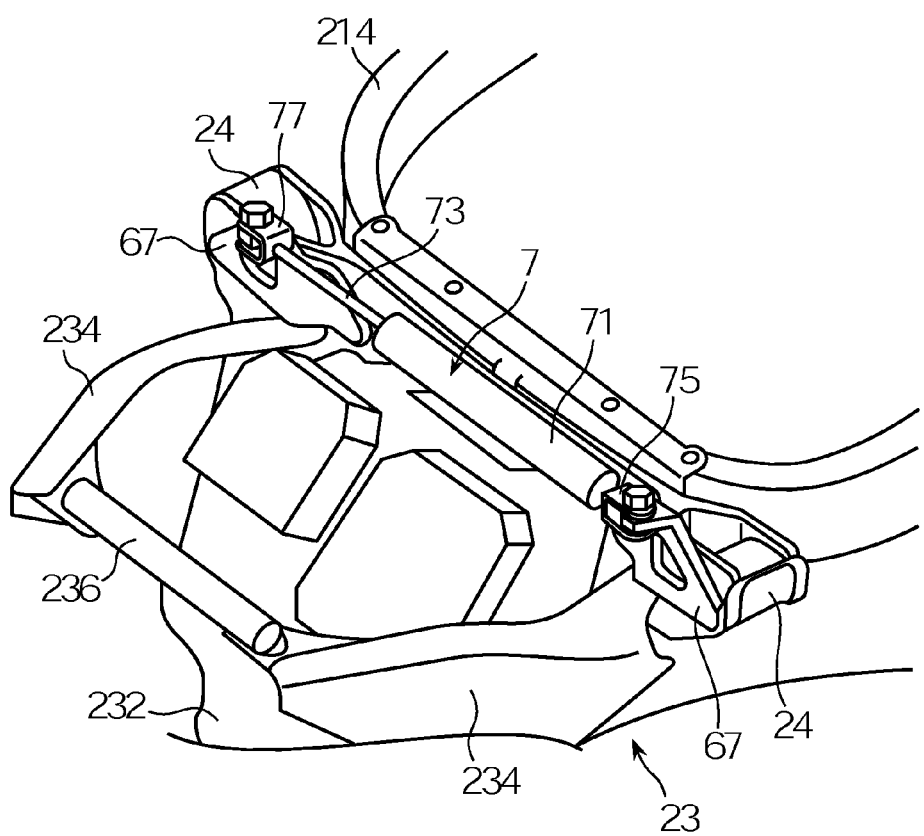
FIG. 5 shows enlarged major elements shown in FIG. 2.

Specifically, one of the vehicle body vibration control dampers 7 is mounted to extend between portions of a member fixed to the vehicle body frame 2, for example, portions of the grip bar 29 fixed to the rear end portion of the belt storage 22 of the vehicle body frame 2 (see FIG. 4), and another one of the vehicle body vibration control dampers 7 is mounted to extend between the pair of left and right attachment portions 24 provided on the ski support portion 23 of the vehicle body frame 2 (see FIG. 5).

Each vehicle body vibration control damper 7 is, for example, a high pressure sealed oil damper. Each vehicle body vibration control damper 7 includes a cylinder 71 and a piston rod 73 extending from the cylinder 71 and movable in the axial direction. In the cylinder 71, for example, oil, high pressure gas, and a spring are sealed, and when a piston (not shown) provided at the tip end of the piston rod 73 moves slightly in the axial direction inside the cylinder 71, a damping force in the opposite direction is generated. Further, attachment pieces 75, 77 are provided for the cylinder 71 and the piston rod 73, respectively.

As shown in FIG. 4, the vehicle body vibration control damper 7 extends between a left portion 291 and a right portion 292 of the grip bar 29 that are spaced apart from each other in the vehicle width direction. Specifically, one of the attachment pieces 75 of the vehicle body vibration control damper 7 is fastened by a bolt or the like to an attachment piece 293 provided on the left portion 291 of the grip bar 29. Further, the other attachment piece 77 of the vehicle body vibration control damper 7 is fastened by a bolt or the like to the attachment piece 294 provided on the right portion 292 of the grip bar 29. The vehicle body vibration control damper 7 generates a damping force against vibrations that change the distance between the left portion 291 and the right portion 292 of the grip bar 29.

When ground touching portions of the track belt 51 of the transmission unit 5 that are spaced apart from each other in the vehicle width direction receive reaction forces mutually different in magnitude from the ground surface and a moment that pushes up one side of the axle extending in the vehicle width direction is transmitted from the transmission unit 5 to the vehicle body frame 2, unique vibrations are caused in the vicinity of the rear end portion, which is a free end portion, of the vehicle body frame 2. According to the present preferred embodiment, since the vehicle body vibration control damper 7 extends between portions of the grip bar 29 fixed to the rear end portion of the belt storage 22 of the vehicle body frame 2, it is possible to damp the unique vibrations caused in the vicinity of the rear end portion of the vehicle body frame 2.

As shown in FIG. 5, the vehicle body vibration control damper 7 is mounted to extend between the pair of left and right attachment portions 24 that are spaced apart from each other in the vehicle width direction and provided on the ski support portion 23 of the vehicle body frame 2. Specifically, one attachment piece 75 of the vehicle body vibration control damper 7 is fastened by a bolt or the like to a bracket 67 fixed to the left attachment portion 24. Further, the other attachment piece 77 of the vehicle body vibration control damper 7 is fastened by a bolt or the like to a bracket 67 fixed to the right attachment portion 24. The vehicle body vibration control damper 7 generates a damping force against vibrations that change the distance between the pair of left and right attachment portions 24.

When the ground touching portions of the track belt 51 of the transmission unit 5 that are spaced apart from each other in the vehicle width direction and receive reaction forces mutually different in magnitude from the ground surface and a moment that pushes up one side of the axle extending in the vehicle width direction is transmitted from the transmission unit 5 to the vehicle body frame 2, unique vibrations in the ski support portion 23 are provided to the front end portion of the vehicle body frame 2. Since vibrations received by the skis 43 are additionally applied to the ski support portion 23, vibrations in the ski support portion 23 can be likely caused as well. According to the present preferred embodiment, since the vehicle body vibration control damper 7 is mounted to extend between the pair of left and right attachment portions 24 provided on the ski support portion 23 of the vehicle body frame 2, it is possible to damp the unique vibrations in the ski support portion 23.

Although an example has been described in the above in which the vehicle body vibration control dampers 7 are mounted to extend between first and second portions that are spaced apart from each other in the vehicle width direction, this is not limiting, and the vehicle body vibration control damper 7 may extend between first and second portions that are spaced apart from each other in the vehicle front-back direction, or between first and second portions that are spaced apart from each other in the vehicle width direction and also in the vehicle front-back direction.

Figure 6:
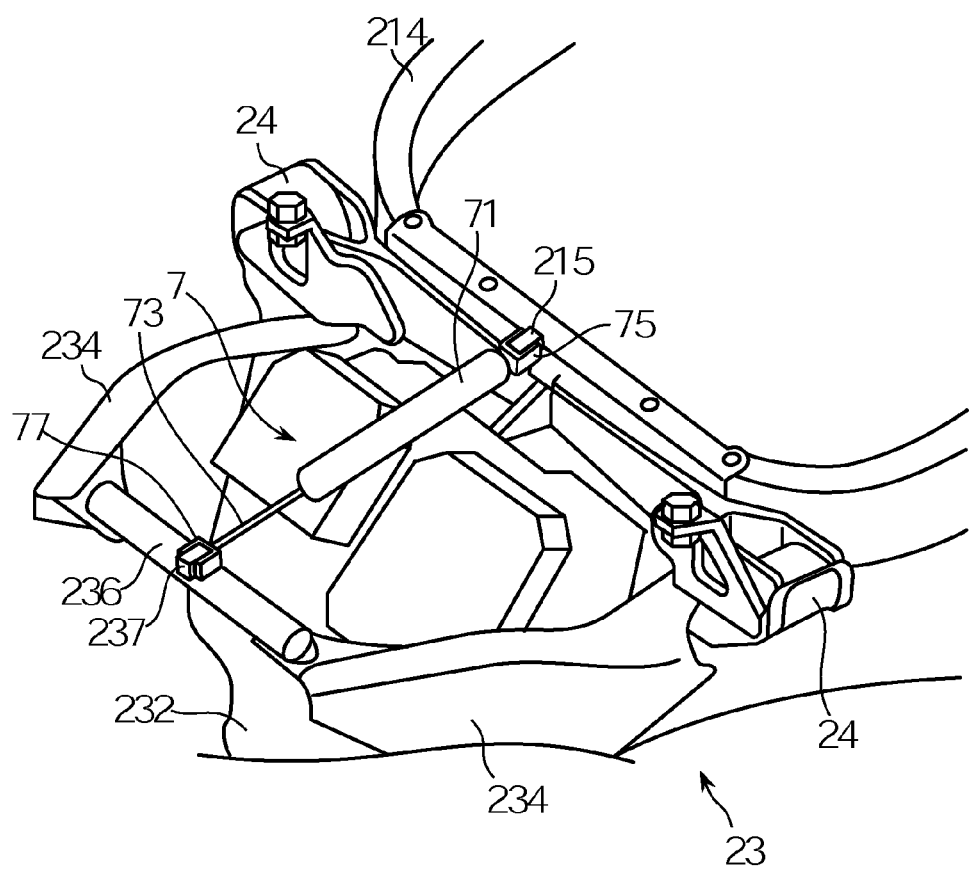
FIG. 6 shows a modified example of an arrangement of a vehicle body vibration control damper.

In the modified example shown in FIG. 6, the vehicle body vibration control damper 7 is mounted to extend in the vehicle front-back direction between the front end portion of the top frame portion 214 provided at the engine storage 21 of the vehicle body frame 2 and the bridge portion 236 provided at the ski support portion 23. Specifically, one of the attachment pieces 75 of the vehicle body vibration control damper 7 is fastened by a bolt or the like to the attachment piece 215 provided at the front end portion of the top frame portion 214. Further, the other attachment piece 77 of the vehicle body vibration control damper 7 is fastened by a bolt or the like to the attachment piece 237 provided at the bridge portion 236. The vehicle body vibration control damper 7 generates a damping force against vibrations that change the distance between the front end portion of the top frame portion 214 and the bridge portion 236.

Figure 7:
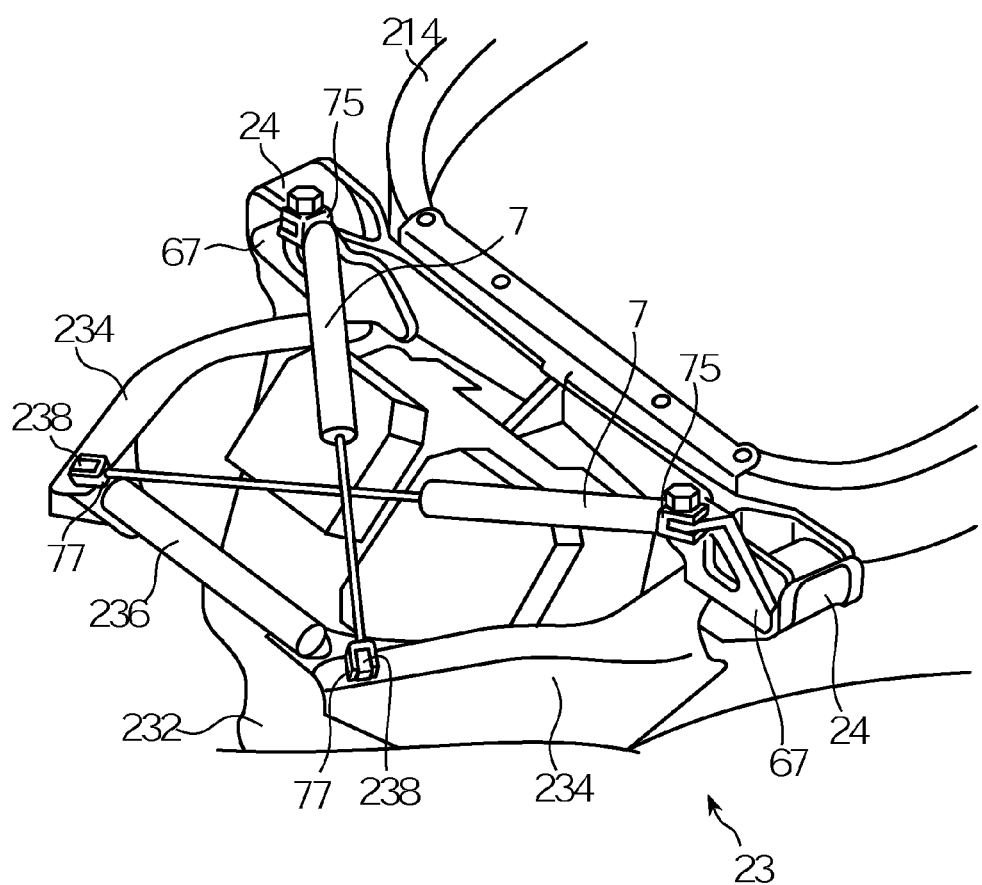
FIG. 7 shows a modified example of an arrangement of a vehicle body vibration control damper.

In the modified example shown in FIG. 7, two vehicle body vibration control dampers 7 are mounted intersecting each other between the attachment portions 24 and the tip end portions of the projecting portions 234 of the ski support portion 23 that are spaced apart from each other in the vehicle width direction and also spaced apart from each other in the vehicle front-back direction. Specifically, one attachment piece 75 of the vehicle body vibration control damper 7 is fastened by a bolt or the like to the brackets 67 fixed to the attachment portions 24. Further, the other attachment piece 77 of the vehicle body vibration control damper 7 is fastened by a bolt or the like to the attachment pieces 238 provided at the tip end portion of the projected portions 234. The vehicle body vibration control damper 7 generates a damping force against vibrations that change the distance between the attachment portions 24 and the tip end portions of the projecting portions 234.

Figure 8:
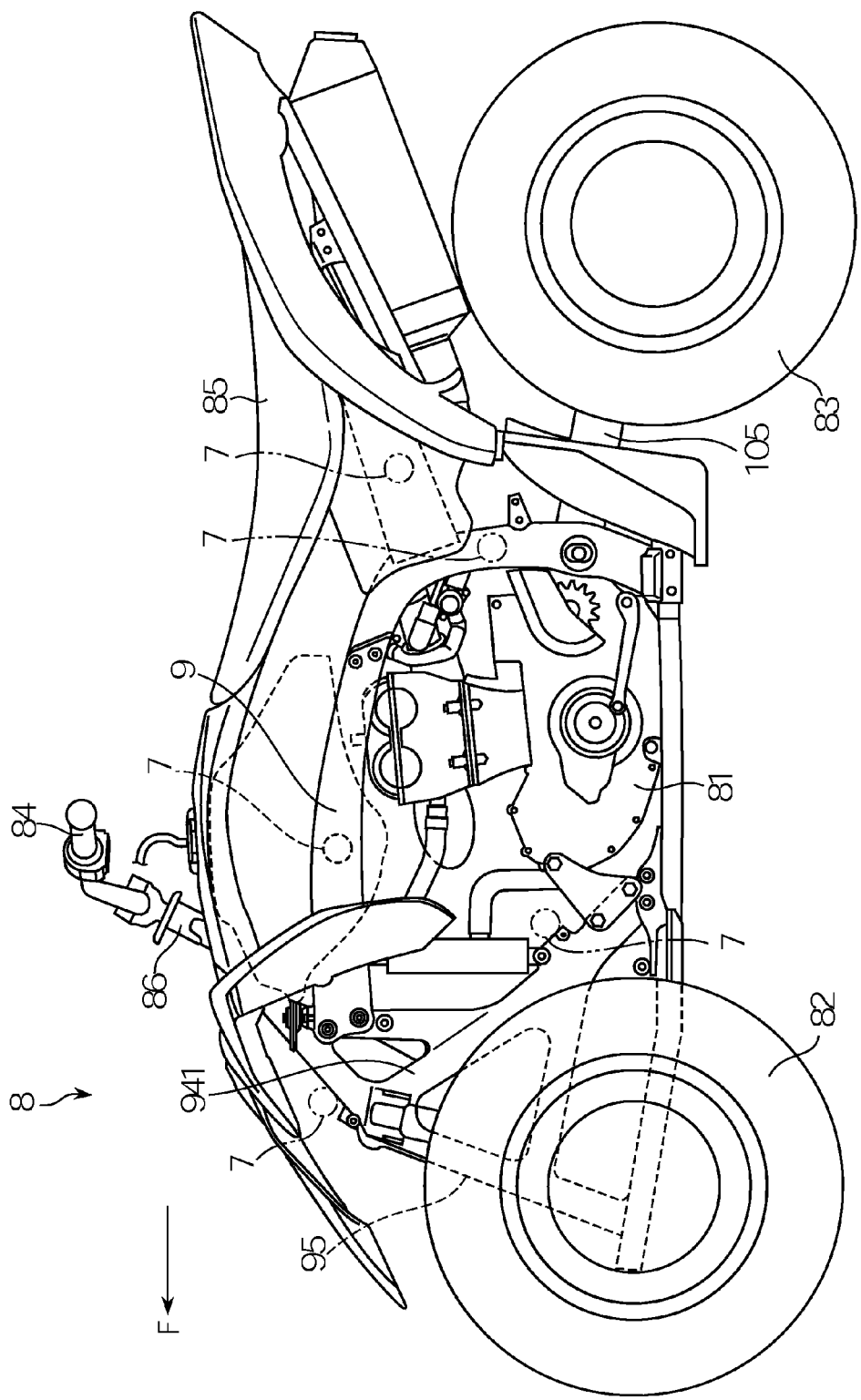
FIG. 8 is a side view of an ATV as an example of a straddle-type vehicle according to a preferred embodiment of the present invention.
Figure 9:
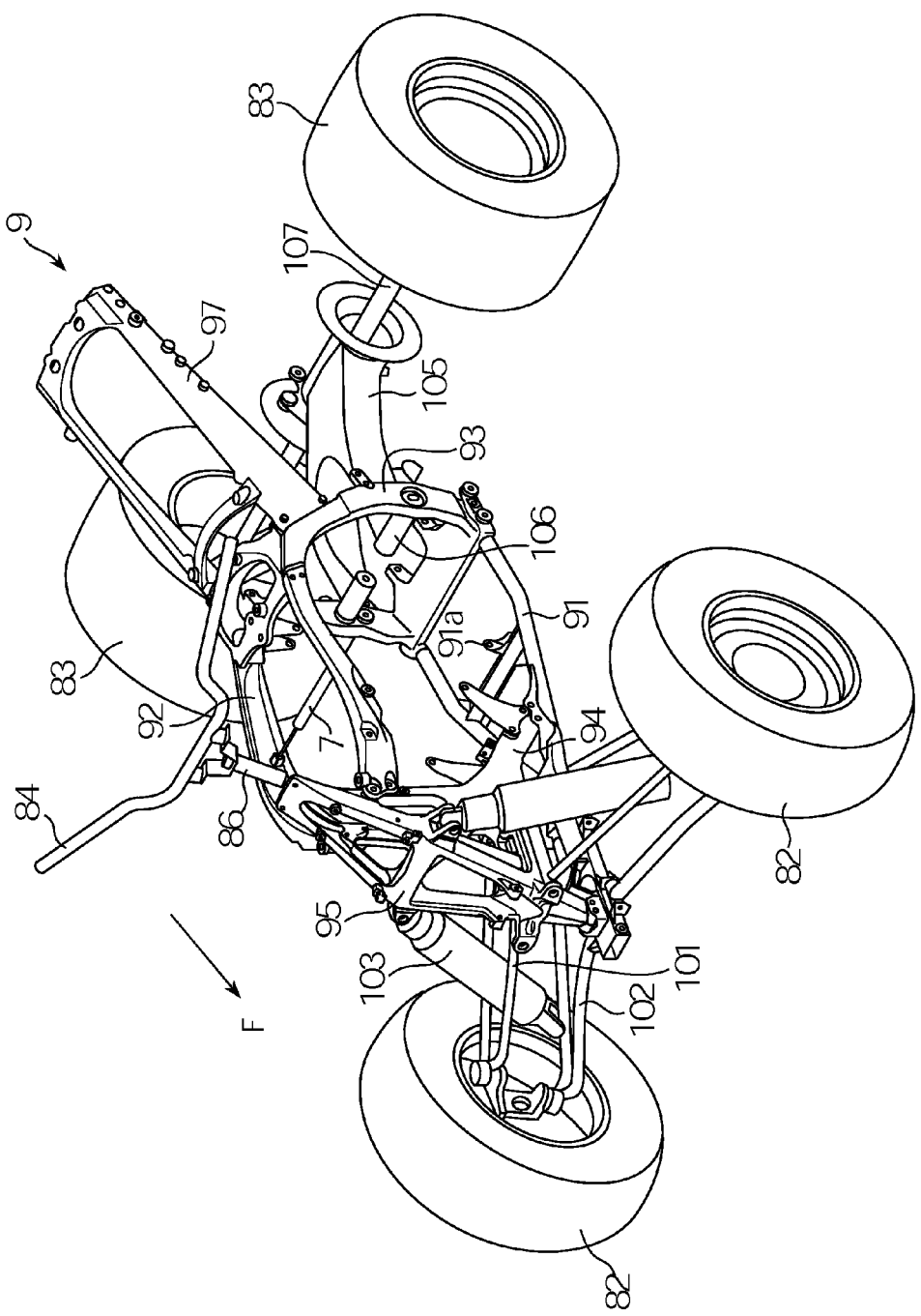
FIG. 9 is a perspective view of a vehicle body frame of the ATV.
Figure 10:
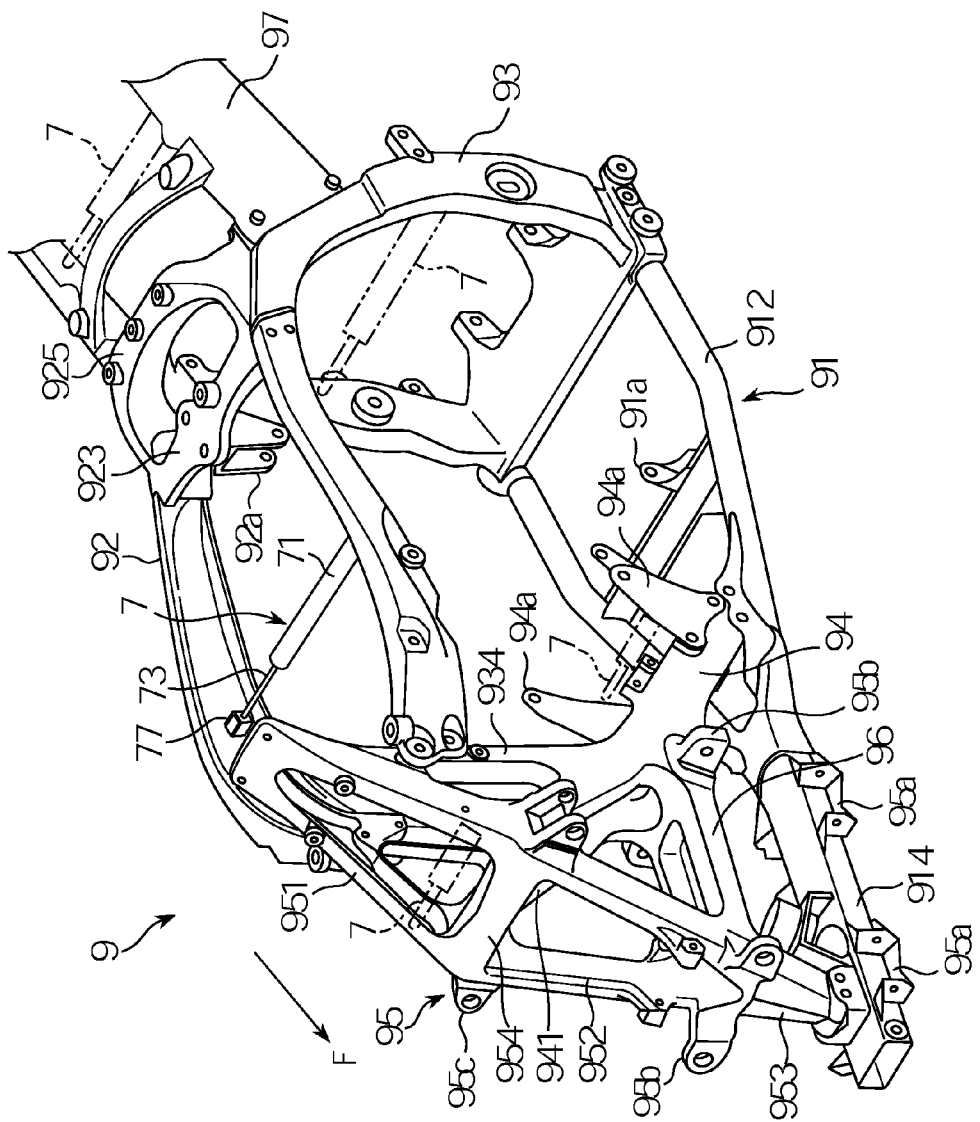
FIG. 10 is a side view of the vehicle body frame of the ATV.

Below, an ATV (All-Terrain Vehicle) as another example of the straddle-type vehicle according to a preferred embodiment of the present invention will be described. FIG. 8 is a side view of an ATV 8. FIG. 9 is a perspective view of a vehicle body frame 9 of the ATV 8. FIG. 10 is a side view of the vehicle body frame 9 of the ATV 8. The arrows F in FIGS. 8 to 10 indicate the vehicle forward direction.

The ATV 8 includes the vehicle body frame 9 made of metal, and an engine 81 mounted at the middle of the vehicle body frame 9 in the front-back direction. The engine 81 preferably is, for example, a water cooled single cylinder engine. A pair of front wheels 82 spaced apart from each other in the left-right direction are mounted at positions more forward than the engine 81. A pair of rear wheels 83 spaced apart from each other in the left-right direction are mounted at positions more rearward than the engine 81. In the present preferred embodiment, the pair of rear wheels 83 are drive wheels and function as a portion of a transmission unit that transmits a driving force generated by the engine 81 to the ground surface.

A handle bar 84 for operation by a driver is mounted on the upper front side of the vehicle body frame 9. A seat 85 for a driver to straddle is mounted on the upper rear side of the vehicle body frame 9. The handle bar 84 is provided at the upper end portion of the steering shaft 86 extending in the up-down direction, and rotation of the handle bar 84 is transmitted to the front wheels 82.

The front wheels 82 are mounted on the respective left and right sides in a front portion of the vehicle body frame 9. The front wheels 82 are supported so as to move up and down by upper arms 101, lower arms 102, and shock absorbers 103. That is, the front wheels 82 are provided with so-called double wishbone suspensions.

A rear arm 105 is mounted behind the engine and extends mainly in the front-back direction. A driving force of the engine 81 is transmitted to the rear wheels 83 via a chain (not shown) or the like. A head pipe 106, namely the front end portion of the rear arm 105, is connected to the vehicle body frame 9 via a pivot axle (not shown) extending in the vehicle width direction, and the rear end portion of the rear arm 105 rotatably supports the axle 107 provided between the pair of rear wheels 83. The rear arm 105 supports the rear wheels 83 so as to move up and down with the pivot axle as a center.

In the ATV 8 of the present preferred embodiment, since no differential gear is mounted between the pair of rear wheels 83, the pair of rear wheels 83 always rotate at the same speed.

As shown in FIGS. 9 and 10, the vehicle body frame 9 includes a lower frame portion 91 extending in the front-back direction below the engine 81, upper frame portions 92 extending in the front-back direction above the engine 81, rear frame portions 93 extending in the up-down direction behind the engine 81, and a front frame portion 95 extending in the up-down direction ahead of the engine 81. The vehicle body frame 9 includes seat rail portions 97 extending rearward from upper portions of the rear frame portions 93. Further, the vehicle body frame 9 includes pillar portions 94 and beam portions 96 positioned between the front frame portion 95 and the engine 81.

The lower frame portion 91 includes a pair of base portions 912 spaced apart from each other in the left-right direction and extending in the front-back direction below the engine 81, and a single front portion 914 positioned more forward than the base portions 912 and extending in the front-back direction at the center in the left-right direction. That is, the lower frame portion 91 preferably has a Y-shape or a substantially Y-shape. The base portions 912 include brackets 91a projecting upward, and the engine 3 is connected to the brackets 91a. The front portion 914 includes two brackets 95a spaced apart from each other in the front-back direction and provided on each lateral surface of the front portion 914, and the lower arms 102 are connected to the brackets 95a.

The upper frame portions 92, the rear frame portions 93, and the seat rail portions 97 are each defined by a pair of portions spaced apart from each other in the left-right direction. Two crossbars 923, 925 are provided at the upper end portion of the rear frame portions 93 and extend in the left-right direction. Of these, the front crossbar 923 includes a bracket 92a projecting downward, and the engine 81 is connected to the bracket 92a. The head pipe 106 of the rear arm 105 is connected to the inner side of the pair of rear frame portions 93 in the vehicle width direction.

The rear end portion of the lower frame portion 91 is connected to the lower end portions of the rear frame portions 93, and the rear end portions of the upper frame portions 92 are connected to the upper end portions of the rear frame portions 93. The front end portions of the seat rail portion 97 are connected to the upper end portions of the rear frame portions 93.

The front frame portion 95 includes upper pillar portions 951, middle pillar portions 952, and a lower pillar portion 953, in which the upper pillar portions 951 preferably have a reversed V-shape expanding in the left-right direction as it extends downward, the middle pillar portions 952, positioned below the upper pillar portion 951, preferably have a V-shape becoming narrower in the left-right direction as it extends downward, and the lower pillar portion 953, positioned below the middle pillar portions 952, extends in the up-down direction. The front frame portion 95 includes a crossbar 954 extending in the left-right direction between the connection portions of the upper pillar portions 951 and the middle pillar portions 952. Brackets 95c are provided on lateral surfaces of the connection portions of the upper pillar portions 951 and the middle pillar portions 952, and the shock absorbers 103 are connected to the brackets 95c.

The upper end portion of the front frame portion 95 is connected to the front end portions of the upper frame portions 92, and the lower end portion of the front frame portion 95 is connected to the front end portion of the front portion 914 of the lower frame portion 91.

The pillar portions 94 extend in the upward and forward direction from the connection portions of the base portions 912 and the front portion 914 of the lower frame portion 91. The upper end portions of the pillar portions 94 are branched into two portions in the front-back direction, namely, front branch portions 941 and rear branch portions 934, in which the front branch portions 941 are connected to the connection portions of the upper pillar portions 951 and the middle pillar portions 952 of the front frame portion 95, and the rear branch portions 943 are connected to the front end portions of the upper frame portions 92. Brackets 94a are connected to the lower end portions of the pillar portions 94, and the engine 81 is connected to the brackets 94a.

The beam portions 96 extend in the front-back direction between the front frame portion 95 and the pillar portions 94. The front end portions of the beam portions 96 are connected to the connection portions of the middle pillar portions 952 and the lower pillar portion 953 of the front frame portion 95, while the rear end portions of the beam portions 96 are connected to midway portions of the pillar portions 94. Brackets 95b are provided on the lateral surfaces of the connection portions of the middle pillar portions 952 and the lower pillar portion 953 of the front frame portion 95, and the connection portions of the beam portions 96 and the pillar portions 94, and the upper arms 101 are connected to the brackets 95b.

In the ATV 8 of the present preferred embodiment, the pair of rear wheels 83 spaced apart from each other in the vehicle width direction receive reaction forces mutually different in magnitude from the ground surface. When the pair of rear wheels 83 receive such reaction forces, a moment that pushes up one side of the pivot axle extending in the vehicle width direction is transmitted from the rear arm 105 to the vehicle body frame 9, which causes unique vibrations in the vehicle body frame 9.

Further, in the ATV 8 in the present preferred embodiment, when an outer wheel side is transmitting a driving force while gripping a road surface during the turn, an inner wheel is slipping since the pair of rear wheels 83 always rotate at the same rotation speed. Since resistance on a road surface is not always constant, it is expected that the inner wheel momentarily repeats gripping and slipping on the road surface, rather than continuing stable slipping. In this situation, a moment that momentarily repeats pushing the inner side of the axle in the running direction and releasing such pushing is transmitted from the rear arm 105 to the vehicle body frame 9 while receiving a moment that pushes the outer side of the axle extending in the vehicle width direction in the running direction, which causes unique vibrations in the vehicle body frame 9.

In the above, the ATV 8 in the present preferred embodiment as well includes a vehicle body vibration control damper 7 to damp the unique vibrations in the vehicle body frame 9, similar to the snowmobile 1 in the above described preferred embodiments.

Specifically, the vehicle body vibration control damper 7 is mounted to extend between the pair of left and right upper frame portions 92 of the vehicle body frame 9 (see FIGS. 9 and 10). The vehicle body vibration control damper 7 generates a damping force against vibrations that change the distance between the pair of left and right upper frame portions 92. With the above, it is possible to damp the unique vibrations in the vehicle body frame 9.

The vehicle body vibration control damper 7 is not limited to the upper frame portions 92, and the vehicle body vibration control damper 7 may be mounted at a different position. For example, as indicated by the long dashed double-short dashed line in FIGS. 8 and 10, the vehicle body vibration control dampers 7 may be mounted to extend between the pair of left and right rear frame portions 93, between the pair of left and right seat rail portions 97, between the upper pillar portions 951 in a reversed V-shape of the front frame portion 95, or between branched lower end portions of the pillar portions 94 in the left-right direction.

In the snowmobile 1 and the ATV 8 in the above described preferred embodiments, a moment that pushes up one side of an axle extending in the vehicle width direction is transmitted from the transmission unit to the vehicle body frame as ground touching portions of the transmission unit spaced apart from each other in the vehicle width direction may receive reaction forces mutually different in magnitude from the ground surface, as a result of which unique vibrations are likely to be caused in the vehicle body frame. Meanwhile, a motorcycle does not have such a moment since the wheels are relatively thin and the vehicle body is inclined when turning.

While preferred embodiments of the present invention have been described above, it is to be understood that variations and modifications will be apparent to those skilled in the art without departing from the scope and spirit of the present invention. The scope of the present invention, therefore, is to be determined solely by the following claims.

What is claimed is:

1. A straddle vehicle comprising:
a vehicle body frame;
a power unit supported by the vehicle body frame;
a steering system supported by the vehicle body frame;
a pair of front wheels spaced apart from each other in a vehicle width direction;
lower arms that support the pair of front wheels and are connected to a front portion of the vehicle body frame;
upper arms that support the pair of front wheels and are connected to the front portion of the vehicle body frame;
a transmission unit that includes a pair of rear wheels spaced apart from each other in the vehicle width direction, that transmits a driving force generated by the power unit to a ground surface, and in which ground touching portions of the transmission unit spaced apart from each other in the vehicle width direction receive reaction forces mutually different in magnitude;
a suspension that suspends the transmission unit so as to swing in an up-down direction around an axle extending in the vehicle width direction relative to the vehicle body frame as a center; and
a vehicle body vibration control damper that extends between a first portion and a second portion spaced apart from each other, each of the first portion and the second portion being located on the vehicle body frame or a member fixed to the vehicle body frame, the vehicle body vibration control damper generating a damping force against variations that change a distance between the first portion and the second portion; wherein
the vehicle body vibration control damper is located between the pair of front wheels when the straddle vehicle is viewed in a front view and/or a plan view; and
connections between ends of the vehicle body vibration control damper and the vehicle body frame are located farther outside in the vehicle width direction than connections between the upper arms and the front portion of the vehicle body frame.

2. The straddle vehicle according to claim 1, wherein the suspension includes a rear arm including a first end portion supported by the vehicle body frame via the axle provided on the vehicle body frame and extending in the vehicle width direction, and a second end portion that rotatably supports the pair of rear wheels.

3. The straddle vehicle according to claim 1, wherein the pair of rear wheels always rotate at a same rotation speed.

4. The straddle vehicle according to claim 1, wherein the first portion and the second portion are spaced apart from each other in the vehicle width direction.

5. The straddle vehicle according to claim 1, further comprising a pivot axle; wherein
the vehicle body frame includes a left rear frame and a right rear frame that extend in the up-down direction behind an engine;
the pivot axle is arranged between the left rear frame and the right rear frame; and
the left rear frame is the first portion and the right rear frame is the second portion such that the vehicle body vibration control damper extends between the left rear frame and the right rear frame.

6. The straddle vehicle according to claim 1, further comprising an additional vehicle body vibration control damper; wherein
the vehicle body frame includes a left seat rail and a right seat rail that extend in a front-back direction, the left seat rail and the right seat rail including a seat mounted thereon; and
the additional vehicle body vibration control damper extends between the left seat rail and the right seat rail.

7. The straddle vehicle according to claim 1, further comprising an additional vehicle body vibration control damper; wherein
the vehicle body frame includes a front frame that extends in the up-down direction ahead of an engine;
the front frame includes upper pillars that define a reversed V-shape expanding in a left-right direction as the upper pillars extend downward;
the upper pillars are arranged between a handle bar and shock absorbers; and
the additional vehicle body vibration control damper extends between the upper pillars.

8. The straddle vehicle according to claim 1, wherein the connections between the ends of the vehicle body vibration control damper and the vehicle body frame are located farther outside in the vehicle width direction than connections between the lower arms and the front portion of the vehicle body frame.

9. A straddle vehicle comprising:
a vehicle body frame;
a power unit supported by the vehicle body frame;
a steering system supported by the vehicle body frame;
a pair of front wheels spaced apart from each other in a vehicle width direction;
a transmission unit that includes a pair of rear wheels spaced apart from each other in the vehicle width direction, that transmits a driving force generated by the power unit to a ground surface, and in which ground touching portions of the transmission unit spaced apart from each other in the vehicle width direction receive reaction forces mutually different in magnitude;
a suspension that suspends the transmission unit so as to swing in an up-down direction around an axle extending in the vehicle width direction relative to the vehicle body frame as a center; and
a vehicle body vibration control damper that extends between a first portion and a second portion spaced apart from each other, each of the first portion and the second portion being located on the vehicle body frame or a member fixed to the vehicle body frame, the vehicle body vibration control damper generating a damping force against variations that change a distance between the first portion and the second portion; wherein
the vehicle body vibration control damper is located between the pair of front wheels when the straddle vehicle is viewed in a front view and/or a plan view;

the vehicle body frame includes a pillar that extends in a front-back direction and the up-down direction ahead of an engine;

the pillar includes branched lower end portions that extend in a left-right direction and connect to the engine via brackets; and the branched lower end portions are the first portion and the second portion such that the vehicle body vibration control damper extends between the branched lower end portions.

* * * * *